United States Patent [19]

Polley

[11] 4,394,002
[45] Jul. 19, 1983

[54] MOUNTING FLANGE FOR WAFERSPHERE BOTTOM OUTLET VALVE

[75] Inventor: Richard B. Polley, St. Charles, Mo.

[73] Assignee: ACF Industries, Incorporated, New York, N.Y.

[21] Appl. No.: 251,407

[22] Filed: Apr. 6, 1981

[51] Int. Cl.³ .............................................. B61D 5/00
[52] U.S. Cl. .................................. 251/144; 137/350; 137/382.5
[58] Field of Search ............. 251/144; 137/350, 382.5; 105/358

[56] References Cited

U.S. PATENT DOCUMENTS

| 4,016,907 | 4/1977 | Rawstron | 251/144 |
| 4,184,663 | 1/1980 | Rollins et al. | 251/144 |
| 4,220,097 | 9/1980 | Wempe et al. | 251/144 |

Primary Examiner—A. Michael Chambers
Attorney, Agent, or Firm—Henry W. Cummings

[57] ABSTRACT

In accordance with the present invention a tank bottom (12) is provided with a lading opening (14) therein. A mounting flange (16) is mounted within this opening. This mounting flange includes a tapered portion (18, 18') extending longitudinally on either side of the lading opening. Preferably the tapered portion includes at least three (3) longitudinal units for each unit the mounting flange extends vertically in excess of one (1) inch below the bottom external surface of the tank. The mounting flange further includes a flange body portion (24) located radially inwardly from the tapered portion having a flange opening (26) for lading to pass through for entry or exit from the tank. The body portion further includes a recess (28) located below the body portion adapted to receive a valve housing (30) having a valve seat and a lading valve (44) located within the housing. Fasteners (40) extend through the valve housing and into the flange body portion outwardly of the valve seat to hold the housing in place within the mounting flange. A shaft (46) to move the valve between open and closed positions relative to the valve seat extends transversely and generally horizontally out of the valve housing. Wedge means (62) extending longitudinally of the outlet are located between the upper portion of the valve housing and the mounting flange effective to carry impact load components applied through the housing to the mounting flange. The longitudinal tapered portions may include spaces (78) between the upper surface of the tapered portion and the tank bottom. For some ladings, steam may be circulated through this space to heat the lading adjacent the outlet.

15 Claims, 5 Drawing Figures

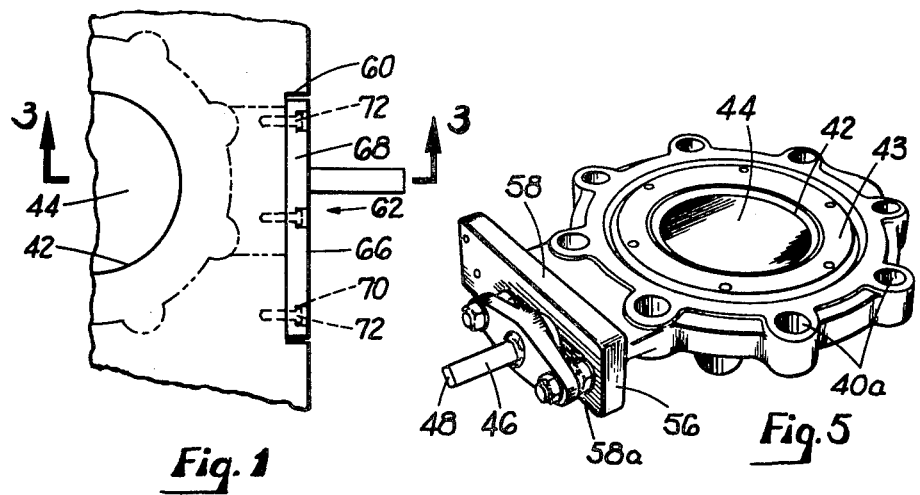
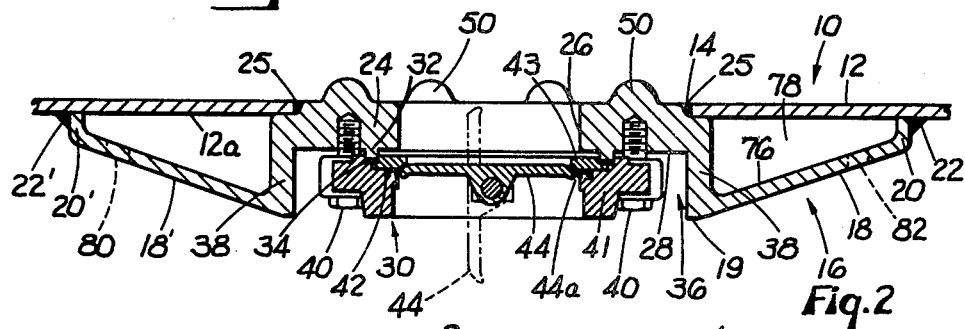
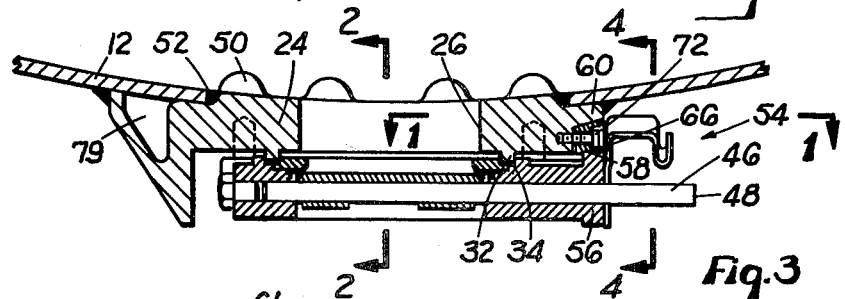
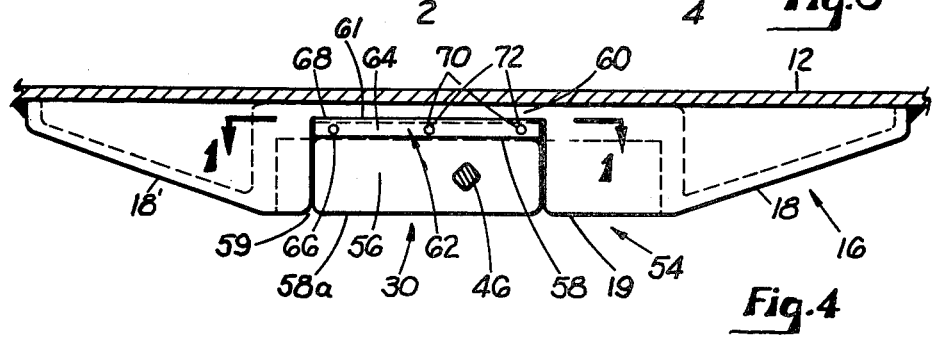

MOUNTING FLANGE FOR WAFERSPHERE BOTTOM OUTLET VALVE

BACKGROUND OF THE INVENTION

U.S. Pat. No. 4,016,907 (Apr. 12, 1977) discloses a commonly used railway tank car lading valve assembly.

However, when installed on a railway tank car, the combined distance of the mounting flange and the valve housing extends downwardly below the lower external surface of the tank bottom in excess of one (1) inch. A skid is therefore required in accordance with AAR specifications for tank cars (Specification M-1002) paragraph E10.00, to protect the valve assembly against shearing off on impact. These regulations require the skid have a three (3) unit longitudinal taper for each single unit of projection in excess of one (1) inch below the external tank bottom surface, and requires that this taper having a sliding surface without discontinuities. This skid adds considerable weight to the car, and adds expenses of material and labor to install the skid.

A butterfly valve is moved between open and closed positions by a shaft which extends through the valve housing on one side of the outlet. This portion of the valve housing adjacent to the shaft does not touch the mounting flange and this creates a gap which cannot carry impact loads having significant components applied vertically, upwardly into the tank mounting flange. In addition, U.S. Pat. Nos. 4,180,242; 4,158,453; 4,184,663; 4,234,158 and 4,234,159 disclose combination skids and valve seats which are tapered in the longitudinal direction to comply with the above AAR regulations. U.S. Pat. No. 4,212,447 discloses a tapered tank car mounting flange. U.S. Pat. No. 4,237,928 discloses a low profile tapered sump.

SUMMARY OF THE INVENTION

The object of the present invention is to provide a valve assembly including a shaft extending generally horizonatally through a valve housing which can carry impact loads having vertical components into the tank mounting flange.

Another object of the invention is to provide a valve assembly which does not require a skid to comply with AAR regulations concerning projections extending below the bottom external surface of the tank.

In accordance with the present invention a tank bottom is provided with a lading opening therein. A mounting flange is mounted within this opening. This mounting flange includes a tapered portion extending longitudinally on either side of the lading opening. Preferably the tapered portion includes at least three (3) longitudinal units for each unit the mounting flange extends vertically below the bottom external surface of the tank in excess of one (1) inch. The mounting flange further includes a flange body portion located radially inwardly from the tapered portion having a flange opening for lading to pass through for entry or exit from the tank. The body portion further includes a recess located below the body portion adapted to receive a valve housing having a valve seat and a lading valve located within the housing. Fasteners extend through the valve housing and into the flange body portion outboard of the valve seat to hold the housing in place within the mounting flange. A shaft to move the valve between open and closed positions relative to the valve seat extends transversely and generally horizontally out of the valve housing. Wedge means extending longitudinally of the outlet are located between the upper portion of the valve housing and the mounting flange effective to carry impact load components applied through the housing to the mounting flange. The wedge means conveniently have a generally horizontal lower surface which rests upon a horizontal upper surface on the housing and a tapered upper surface which engages a tapered surface on the mounting flange. Fasteners extending generally horizontally into the mounting flange hold the wedge means in place. The longitudinal tapered portions may include spaces between the upper surface of the tapered portion and the tank bottom. For some ladings, steam may be circulated through this space to heat the lading adjacent the outlet.

IN THE DRAWINGS

FIG. 1 is a partial plan view of the valve assembly of the present invention;

FIG. 2 is a longitudinal vertical sectional view of FIG. 1 looking in the direction of the arrows along the line 2—2 in FIG. 3;

FIG. 3 is a transverse vertical sectional view looking in the direction of the arrows along the line 3—3 in FIG. 3;

FIG. 4 is a longitudinal vertical sectional view of FIG. 1 looking in the direction of the arrows along the line 4—4 in FIG. 3;

FIG. 5 is a schematic perspective view of a bottom outlet valve and housing included in the valve assembly in the present invention.

DESCRIPTION OF PREFERRED EMBODIMENTS

In the drawings a railway tank car 10 includes a tank bottom 12. The bottom 12 includes an opening therein 14. A mounting flange 16 includes longitudinally extending tapered portions 18, 18' extending in opposite directions along the longitudinal extent of the tank bottom 12. The tapered portions 18 preferably extend longitudinally at least three (3) units for each single unit that the mounting flange extends vertically in excess of one (1) inch below the bottom surface 12a of the tank bottom. Tapered portions 18 and 18' terminate in vertical portions 20, 20' which abut the tank bottom and are welded thereto at 22, 22'.

A mounting flange body portion 24 is located above and radially inwardly from tapered portions 18, 18'. The body portion 24 is welded to the tank at 25 and includes a circular lading opening 26. A horizontal surface 28 is adapted to receive a valve housing 30, and includes a downwardly extending tongue 32 adapted to be received within a groove 34 provided in the valve housing 30. The housing 30 fits within a recess 36 defined by a wall 38 extending from tapered portions 18, 18' up to body portion 24 and by horizontal surface 28. Fasteners 40 extend vertically through openings 41 in the housing 30 and into the mounting flange body portion 24.

As described in greater detail in the said U.S. Pat. No. 4,016,907, the housing includes a housing body 41 including a valve seat 42 of an elastomeric material held in place with a plate 43. A valve member 44 (FIG. 5) is rotatable between open and closed positions to provide fluid communication between the opening 26 and a lading opening 44a in the valve housing. As is also described in greater detail in the U.S. Pat. No. 4,016,907 patent, a shaft 46 to move the valve 44 between open and closed positions extends outwardly from the housing 30. A suitable handle or extension is connected to a non-round end 48 to rotate the shaft 46 to move the valve 36 between open and closed positions.

It is to be noted that the fasteners 40 do not extend below the lower surface 19 of the mounting flange 16. Furthermore, the housing 30 does not extend below the lower surface 19. Therefore, a separate skid is not required to comply with AAR specifications for tank cars (Specification M-1002) paragraph E10.00 (copy in application file).

In order to carry the lading loads, the mounting flange is conveniently provided with projections 50 of added material extending upwardly into the tank above the fasteners 40. This insures that the body portion of the flange will be able to satisfactorily carry these lading loads.

On the transverse side 54 of the outlet adjacent the shaft 46, the housing is provided with a handle support portion 56. The handle support portion 56 includes a top horizontal surface 58 and a bottom horizontal surface 58a. The mounting flange body portion 24 includes a formed opening or slot 59. Bottom horizontal surface 58a is in the same vertical plane with lower surface 19 of mounting flange 16.

In accordance with one aspect of the invention, wedge means 62 are located between the housing portion 56 and the mounting flange portion 60 to carry vertical components of impact loads applied from this side of the housing into the mounting flange. The wedge means 62 preferably comprises a transversely extending wedge member 64 having a lower horizontal surface 66 and an upper tapered surface 68. Wedge member 64 is provided with a plurality of openings 70 to receive fasteners 72 extending into the mounting flange which hold the wedge in place between the housing surface 56 and the mounting flange body surface 61. With this wedge means, vertical components of any impact loads applied to this side 54 of the housing are transferred vertically upwardly through the wedge means and into the mounting flange body portion 24. This avoids these load components being transmitted to the bolts 40, resulting in failure of the bolts 40 and separation of the housing 30 and the valve 44 from the closed seated position holding the lading in place within the tank 10.

It is to be noted that a space 78 exists between the upper surface 76 of the tapered portion 18 and the bottom surface 12a of the tank bottom. This space may extend through the body portion 24 opposite the shaft 46 as indicated at 79. If desired, steam may be introduced through an inlet 80 and removed through an outlet 82 to heat the lading adjacent to the lading outlet.

It is apparent that with the mounting flange and valve assembly of the present invention, a skid is not required in order to comply with the above identified AAR regulations. This results in a considerable savings in car weight of up to 1500 pounds and higher. Furthermore, the savings of skid material and installation may range up to $1,000 per car and more. It is therefore apparent that the present invention provides a significant savings in weight and cost over constructions requiring such a skid.

What is claimed is:

1. A railway tank car valve assembly comprising: a tank bottom having a tank opening therein; a mounting flange mounted adjacent said tank opening; said mounting flange having a tapered portion extending longitudinally on either side of said lading opening; said mounting flange further including a flange body portion located inwardly from said tapered portion having a flange opening for lading to pass through for entry or exit from the tank; said body portion further including a recess located below the body portion adapted to receive a valve housing having a valve seat and a lading valve located within the housing; first fastener means holding said housing in place within said mounting flange; shaft means to move said valve between open and closed positions relative to said valve seat extending out of the valve housing, and wedge means extending longitudinally of said mounting flange and located between and engaging both said valve housing and said mounting flange adjacent said shaft means effective to carry impact load components applied through said valve housing to said mounting flange; and thereby protect said shaft means.

2. A railway tank car valve assembly according to claim 1, wherein the tapered portion includes at least three (3) longitudinal units for each single unit the mounting flange extends vertically below the bottom external surface of the tank in excess of one (1) inch.

3. A railway tank car valve assembly according to claim 1, wherein said wedge means have a generally horizontal lower surface which rests upon a horizontal surface of the housing and a tapered upper surface which engages a tapered surface on the mounting flange whereby movement of wedge means in horizontal directions provides adjustment means to issue contact between valve housing and mounting flange.

4. A railway tank car valve assembly according to claim 3, including second fastening means extending into the mounting flange holding said wedge means in place.

5. A railway tank car valve assembly according to claim 4, wherein said second fastening means comprise mechanical fasteners.

6. A railway tank car valve assembly according to claim 4, wherein the mounting flange includes portions of added material above said first fasteners to carry lading loads acting upon the valve seat and the housing.

7. A railway tank car valve assembly according to claim 1, wherein said longitudinal tapered portions include spaces between the upper surface of the taper and the tank bottom.

8. A railway tank car valve assembly according to claim 7, wherein means are provided for circulating a heating fluid through said space to heat the lading adjacent the outlet.

9. A railway tank car assembly according to claim 1, wherein said valve housing includes a handle support portion located in the same vertical plane as the bottom of said mounting flange.

10. A railway tank car valve assembly comprising: a tank bottom having a tank opening therein; a mounting flange mounted adjacent said tank opening; said mounting flange having a tapered portion extending longitudinally on either side of said lading opening; said mounting flange including a flange body portion located inwardly from said tapered portion and having a flange opening for lading to pass through for entry or exit from the tank; said body portion further including a slot located below the body portion adapted to receive a valve housing having a valve seat and a lading valve located within the housing; first fastening means holding said housing in place within said mounting flange; shaft means to move said valve between open and closed positions relative to said valve seat extending transversely and generally horizontally out of the valve housing, and load carrying means extending longitudinally of said mounting flange, and located between and engaging both said housing and said mounting flange adjacent said shaft means effective to carry impact load components applied through said housing to said mounting flange and thereby protect said shaft means.

11. A railway tank car valve assembly according to claim 10, wherein said load carrying means constitutes adjusting means to insure contact between said housing and said flange.

12. A railway tank car valve assembly according to claim 11, wherein the adjusting means comprises wedge means located between said housing and said mounting flange.

13. A railway tank car valve assembly according to claim 12, wherein said wedge means have a generally horizontal lower surface which rests upon a horizontal surface of the housing and a tapered upper surface which engages a tapered surface on the mounting flange.

14. A railway tank car valve assembly according to claim 13, wherein second fastening means hold said wedge means in place.

15. A railway tank car valve assembly according to claim 14, wherein said second fastening means are mechanical fasteners extending generally horizontally.

* * * * *

UNITED STATES PATENT AND TRADEMARK OFFICE
CERTIFICATE OF CORRECTION

PATENT NO. : 4,394,002
DATED : July 19, 1983
INVENTOR(S) : Richard B. Polley

It is certified that error appears in the above-identified patent and that said Letters Patent are hereby corrected as shown below:

On the front page, in the title, please change "WAFERSPHERE" to --BUTTERFLY--.

In column 1, line 1, please change "WAFERSPHERE" to --BUTTERFLY--.

Signed and Sealed this

Thirteenth Day of December 1983

[SEAL]

Attest:

GERALD J. MOSSINGHOFF

Attesting Officer

Commissioner of Patents and Trademarks